United States Patent
Kuhlmann

[15] 3,692,169
[45] Sept. 19, 1972

[54] EGG GATHERING MECHANISM

[72] Inventor: Josef H. Kuhlmann, Horstmarer Strasse 9, 4401 Laer, Germany

[22] Filed: Dec. 7, 1970

[21] Appl. No.: 95,857

[30] Foreign Application Priority Data

Dec. 12, 1969 Germany..........P 19 62 423.8

[52] U.S. Cl..................................................198/43
[51] Int. Cl.............................................B65g 47/00
[58] Field of Search.....198/43, 45; 119/48; 259/180; 214/16 R

[56] References Cited

UNITED STATES PATENTS

| | | |
|---|---|---|
| 3,002,494 | 10/1961 | Murray........................119/48 |
| 3,365,083 | 1/1968 | Baumann et al. ........214/16 R |
| 522,822 | 7/1894 | Campbell.................214/16 R |
| 2,865,493 | 12/1958 | St. Pierre...............198/171 X |
| 1,821,438 | 9/1931 | Levin.....................191/171 X |

Primary Examiner—Evon C. Blunk
Assistant Examiner—Douglas D. Watts
Attorney—Merchant and Gould

[57] ABSTRACT

An egg gathering mechanism for multi-level block-nest plants with egg conveyor mechanisms allocated to each level. The conveyor mechanisms feed into drop-tubes which have devices for retarding free-fall at the heads of the blocks as well as additional transport devices for the eggs allocated to the lower end of the drop-tubes. The invention is distinguished by the use of chaff to retard the free-fall of the eggs and by the mechanisms provided above and below the drop-tubes for feeding and removing the chaff.

10 Claims, 5 Drawing Figures

EGG GATHERING MECHANISM

BACKGROUND OF THE INVENTION

1. Field of the Invention

The invention refers to an egg gathering mechanism for multi-leveled plants with blocks of nests and egg-collecting belts in each level, whereby the belts feed drop-tubes at the head of each block with devices for retardation of free-fall, and whereby additional devices are provided at the lower end of the drop-tubes for the further transportation of the eggs.

2. Description of the Prior Art

In multi-leveled plants with blocks of nests it is desirable to avoid handling of the eggs by humans, as is often still customary. In this way the considerable expenditure of time necessary for handling is reduced. For this purpose, it has been suggested, for example (U. S. Pat. No. 3,002,494) that so-called egg gathering belts be supplied for each of the levels, whereby these belts feed drop-tubes which, at the head of the block, are provided with devices for retarding free-fall and, at the lower end of the drop-tubes, with devices for the further transportation of the eggs to an egg collection point. With such a plant, automatic gathering of the eggs is possible in multi-leveled plants with blocks of nests.

In the familiar device, retardation of the free-fall of the eggs is accomplished by the installation in the drop-tubes of sine-shaped tubes, the diameter of which is basically equivalent to the diameter of an egg. Or, retardation is accomplished by the installation in the vertical tubes of slanting diversion plates which force the eggs into a sine-shaped path. By these means it does not seem possible to achieve the necessary braking of the free-fall without destroying the egg shell.

It has also been already proposed (German Pat. No. 1,192,449) that in transporting the eggs chaff be used in a horizontal groove, whereby the chaff makes it possible to convey the eggs in a gentle fashion. In this process, the eggs are laid by the hens on slanted floor tiles. The eggs pass from these floor tiles into the transport groove which is filled with chaff. This familiar arrangement could not suggest the use of straw as a means to retard free-fall in vertically allocated tubes, since in this case the straw is used in connection with fundamentally different nest installations.

SUMMARY OF THE INVENTION

Starting with a multi-leveled plant with blocks of nests, the invention answers to the task of providing an installation which will assure faultless conveyance of the individual eggs from the various levels to the egg gathering mechanism, such that there is no need to worry about breakage of the eggs.

The objective of the invention is attained by using chaff to retard the free-fall of the eggs, whereby feeder and removal devices are provided for the chaff at the upper and lower ends, respectively, of the drop-tube so as to keep the chaff in continuous and endless circulation.

In this process it is possible to install the feeder device for the chaff and the transportation device at the lower end of the drop-tube in such a way that several drop-tubes are accommodated simultaneously.

Further, it is proposed that the collecting-transport device be realized as an endlessly circulating transport device which receives the eggs at the lower end of the drop-tube(s) and which returns in the vicinity of the upper end of the drop-tube(s) and thus simultaneously serves as a feeder device for the chaff. Further, it is proposed that a familiar single-chain cog conveyor serve as the transport device for the collecting-transport device and the egg transport device.

To insure that the cogs of the single-chain cog conveyor constantly press against the bottom of the transportation device, it is suggested that the cogs be angled and V-shaped, whereby the vertex faces upwards and the two sides, which bound an open space, face downwards and press against the bottom of the transport trough. Thus, because of the resistance generated, the cog moves along firmly pressed against the bottom of the transport device.

To insure that the cogs of an endlessly circulating single-chain cog transporter constantly face in the desired direction, i. e., that the vertex constantly face upwards, it is further proposed that a so-called chain-reversal be built into the single-chain cog transporter used in the collecting-transport device. At the same time, this insures that in each instance the chain and the drive-wheel and reverse-wheel will be located on the same side of the trough, since, of course, the drive-wheel and the reverse-wheel can be located only on one side of the trough in a single-chain cog transporter.

As explained above, the collecting-transport device is constructed as an endless single-chain cog transporter and in the area of the chain return it is desirable that the transport device be free of chaff. For this reason a silo for the chaff is introduced before the chain return (as viewed in the transport direction of the collecting-transport device). This silo, which connects the upper and lower housings, makes it possible to store the chaff left over from the upper housing after passage of the last drop-tube so that it can be taken from the lower housing of the collecting-transport device as needed. Thus, in this area, sufficient chaff levels are maintained to insure gentle movement of the eggs.

The egg transport device, which in the area of the drop-tube has an opening in the bottom for the passage of the eggs and the chaff into the drop-tube, passes through each drop-tube. In installations which operate with several stories of cages located one above the other, it is proposed that the drop tube have (a) a guide baffle which screens the egg transport device and which is installed diagonally above each egg transport device; (b) a diversion baffle installed below each egg transport device and which diverts the path of the chaff. Thus, the chaff follows a basically serpentine path from top to bottom.

A drop opening is provided in the diagonal guide baffle above the egg transport device. As viewed in the transport direction of the egg transporter, the drop opening is located behind the bottom opening in the egg transport device. Further, as viewed in the transport direction of the egg transporter, adjustable pushers are installed behind the bottom opening of the egg transport device which limits the level of the chaff in the trough of the egg transport device. By means of these pushers, the angle of exit of the chaff from the drop-tube in the direction of the egg transport device can be limited as desired.

The bottom of the lowest egg transport device is closed in the area of the drop-tube through which it passes. Instead of this bottom opening, a bottom opening is provided above the collecting-transport device, which lies behind the drop-tube as viewed in the direction of the egg transporter. This insures that in spite of the revolving collecting-transport device, the drop-tube cannot run out. Rather, this drop-tube can be emptied only if at least the lowest egg transport device is circulating.

Since the lowest egg transport device completely deposits the chaff contained in the transport trough into the collecting-transport device, a feeder tube is provided for the chaff, which moves chaff from the drop-tube into the lowest egg transport device behind the bottom opening.

Further advantages and features of the device constituting the invention are apparent in the following description according to the illustrations.

DESCRIPTION OF THE PREFERRED EMBODIMENT

Figure 1:
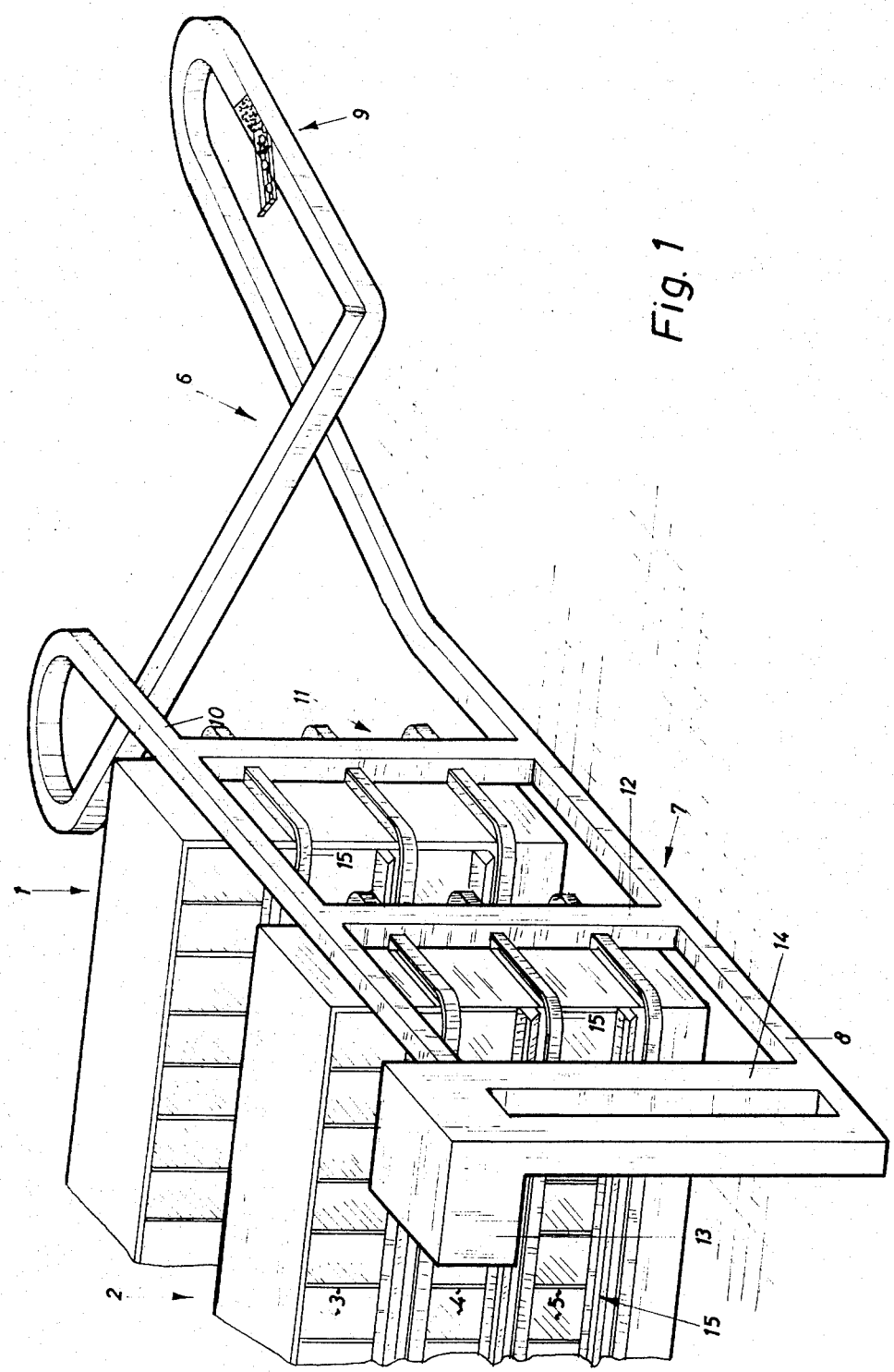
FIG. 1 is a view in perspective of two cage batteries with stories located one above the other and the collecting device for the eggs installed on the front side of the batteries, whereby this collecting device is represented as enclosed, which may be necessary in certain cases for reasons of safety.
Figure 2:
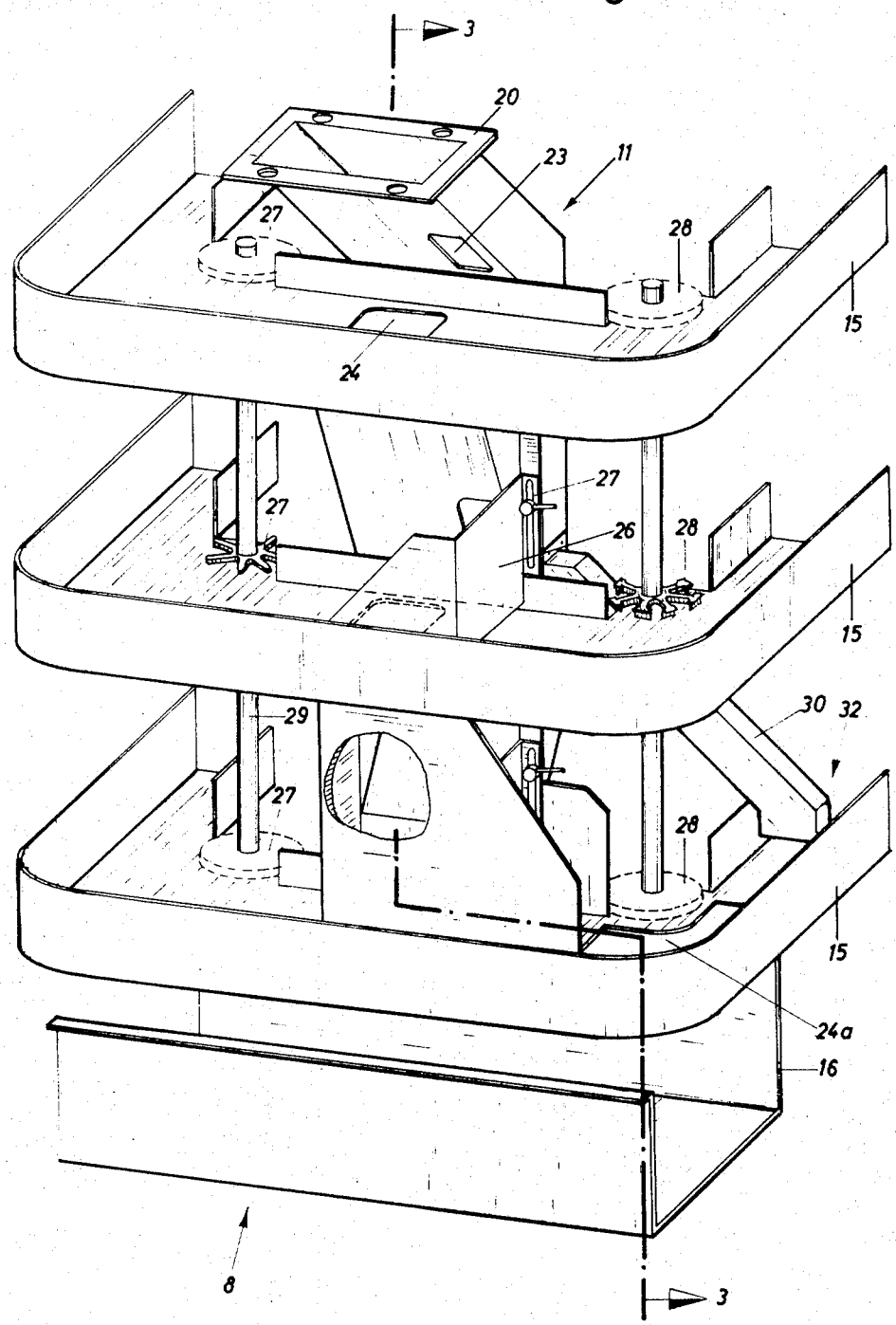
FIG. 2 is a view in perspective of the drop-tube and the egg transport device at the head of the cage batteries. The transport device is omitted in the egg transport device as is also the upper housing of the collecting transport device. These omissions are for reasons of clarity.

In FIG. 1, 1 and 2 designate two cage batteries which exhibit three cage-stories 3, 4, 5 situated one above the other, which, when viewed in a horizontal plane, are constructed double, i.e., on one level, two cages are situated side by side. Such cage batteries are known and thus are part of the background technology.

In front of cage batteries 1 and 2 an egg collecting device is installed which is generally designated as 6. Basically, this device consists of a collecting-transport device 7, of which the lower section 8 traverses an egg collection point, while the upper section 10 provides for feeding chaff to drop-tubes 11 and 12 which are located at the head of cage batteries 1 and 2. 13 designates a drive box which provides for the return of the chain which will be described in greater detail in the following. 14 describes a silo, which joins upper section 10 with lower section 8 before the chain return and at this point provides for the storage of the chaff brought along from the upper section while at the same time preventing this chaff from being carried through the chain return 13.

So-called egg transport devices 15 are installed in front of the individual stories of the cage batteries. The construction of these is essentially identical and they are therefore designated with only a single reference figure.

The collection of the eggs at egg collection point 9 takes place in a familiar fashion and therefore requires no more specific discussion here.

Both collecting-transport device 7 and the egg transport device 15 are constructed as an open transport trough 16 (or 17), in which a so-called single-chain cog transporter 18 (or 19) circulates. The cog transporter is familiar and its construction shown more clearly in FIGS. 4 and 5.

In FIG. 2 one of the drop-tubes 11, 12 situated in front of the cage batteries 1, 2 is shown by way of illustration. For clarity, the upper return section 10 of the collecting-transport device 7 is not shown, while the lower section 8, i.e., the trough 16, is clearly recognizable.

Figure 3:
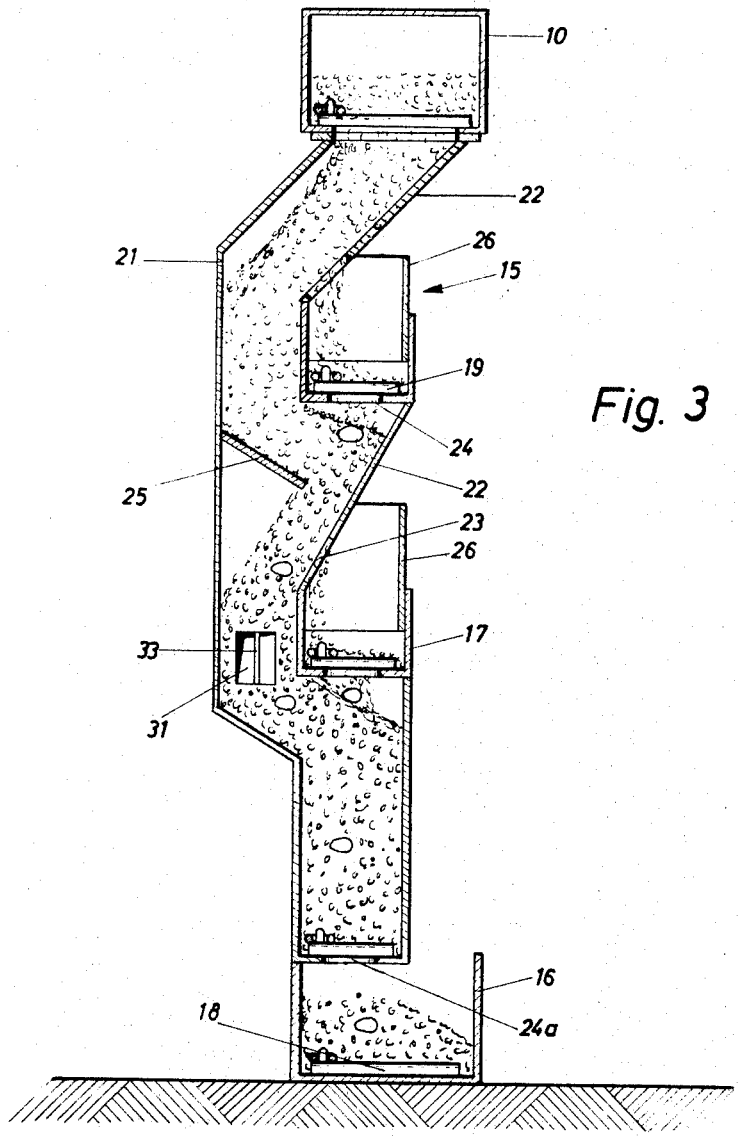
FIG. 3 is a vertical cross section taken along line 3—3 in FIG. 2.

FIG. 3 shows a cross section through drop-tube 11 and, to facilitate comprehension, both figures shall be explained simultaneously. The actual drop-tube 11 is connected to the upper section 10 of the collecting-transport device by means of an appropriate flange construction 20. The drop-tube consists of a rear wall 21, which runs from top to bottom with a certain bend. The front wall of the drop-tube is provided by the guide baffle 22, which is diagonally situated above each egg transport device 15 and exhibits a drop opening 23 in the area directly above the egg transport device. Through this opening the chaff slipping along on the inside of guide baffle 22 can return to the trough of egg transport device 15. By installing guide baffle 22 diagonally above each egg transport device 15 the egg transport device 15 is made to pass through drop-tube 11, whereby the egg transport device 15 exhibits a bottom opening 24, through which chaff and eggs can fall. It is clear that in the illustration provided by FIG. 3 the middle guide baffle 22 connects to the outer edge of the trough of egg transport device 15. In the area below each egg transport device a diversion baffle 25 is installed and protrudes diagonally into the space of the drop-tube. The diversion baffle causes a diversion of the chaff and in this way assures that the amounts of chaff needed will be low.

When viewed in the direction of the movement of the single-chain cog transporter installed in the trough of the egg transport device 15, a pusher 26 is installed behind each bottom opening 24. The lower edge of the pusher is adjustable for clearance relative to the bottom of egg transport device 15, for which purpose a simple screw-closer 27 is provided in the model illustrated here. This screw-closer holds the pusher in the desired operating position, i.e., at the desired height.

The necessary drive gears for the single-chain cog transporter in FIG. 2 are designated as 27, whereby a single motor (not visible in the drawing) is sufficient to power the three stories shown in the drawing located one above the other. The necessary simple return gears are designated as 28. It is of course possible to employ a separate and correspondingly smaller motor for each chain drive gear 27 instead of a single motor and a single drive shaft 29.

In the lowest egg transport device the bottom opening 24 is not located in the area of the drop-tube as is the case in the upper and middle egg transport device.

Rather, the bottom opening 24a in the lowest egg transport device lies relative to the direction of motion of the single-chain cog transporter behind the area of the drop-tube, but still above trough 16 of collecting-transport device 7. In this manner and in conjunction with pusher 26 it is possible to prevent the chaff present in the area of the drop-tube from flowing out when at least the lower egg transport device 15 is shut off. This effect is achieved since there is still ample space on the floor surface behind the pusher to permit the chaff mixed with eggs to stack up under its own weight.

However, since the chaff present in the lowest egg transport device 15 is virtually entirely deposited in collecting-transport device 7 through bottom opening 24a, it is necessary to feed additional chaff into the lowest egg transport device 15. This is accomplished by equipping drop-tube 11 with a feeder tube 30 which is connected to a corresponding different opening into which it opens, as indicated with 32. A crossbar 33 provided in opening 31 prevents eggs from drop-tube 11 from also being moved through feeder tube 30 to the lowest egg transport device.

Figure 4:
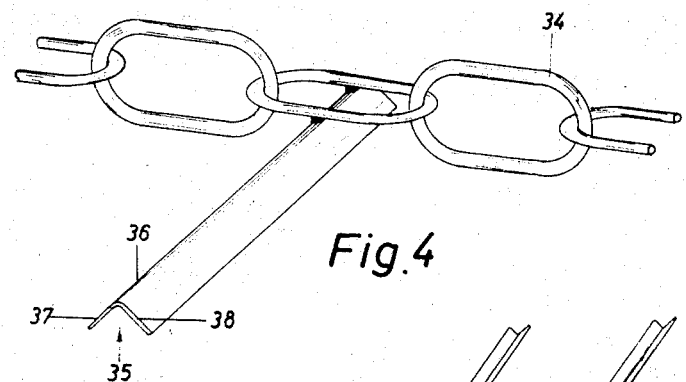
FIG. 4 is a model illustration on a larger scale of one part of the single-chain cog transporter.

FIG. 4 shows the construction of the single-chain cog transporter on a larger scale, whereby 34 designates the chain and 35 the cog, which is attached to the chain in such a way that its vertex 36 faces up, while the two outer edges of sides 37 and 38 press against the bottom of the trough of each particular transport device or apparatus. This arrangement insures that the cog is held firmly against the bottom by the motion and the pressure thereby generated which builds up on the front side of the cog. As a result, tension on the chain will not under certain conditions pull or pry up the cog.

Figure 5:
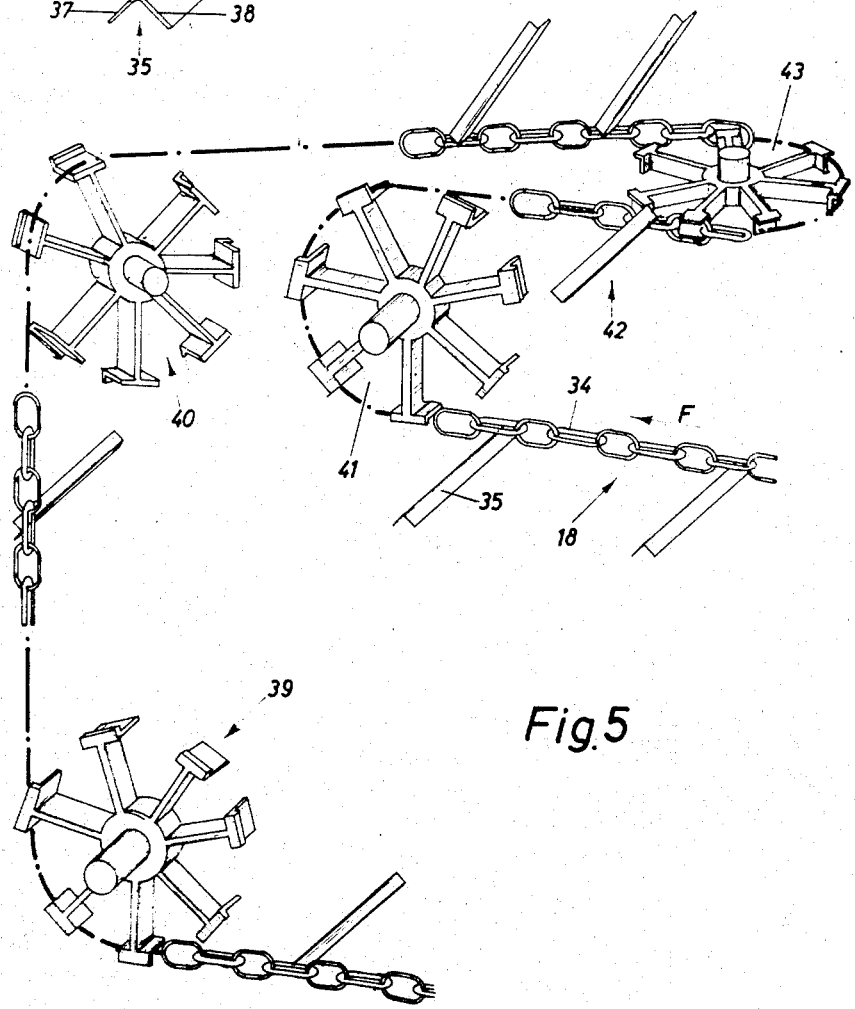
FIG. 5 is an illustration of a chain return mechanism for the invention.

FIG. 5 shows a schematic version of the chain return. Between the lower return gear which is marked as 39 in FIG. 5 and the upper return gear marked as 40 in FIG. 5, it is easy to twist the chain, for example when the entire chain component is set down, since experience has shown that the chain has enough slack to accomplish this by "hand-twisting". If such is not the case, the return gears 39 and 40 must be constructed as chain gears, in disagreement with the illustration in FIG. 5. An example of such construction is provided by drive gears 27 in FIG. 2. In this way, firm and reliable guidance is provided for the chain.

The problem of the chain return arises as follows: If the chain were simply returned in a normal fashion between the upper and the lower sections 8 and 10 the chain would end up either in the upper section or the lower section with the vertex facing up. Furthermore, in single-chain cog transporters it is always necessary to take measures to insure that the chain always passes on the inside of a curve, since in single-chain cog transporters this is the only area in which trouble-free guidance and return of the chain is possible.

In FIG. 5 F designates an arrow which shows the direction of motion of the chain. It is obvious that when viewed in the direction of motion of the chain, the chain will lie on the right side in the upper section and the cogs will point to the left and thus face upwards at the vertex, as they are supposed to. With the rotation of the return gear 41 which is situated in a vertical plane, the cogs are now reversed, so that the vertex of the cog points downward, as illustrated by the cog labeled 42. After this reversal, the chain passes around reversing gear 43 which rests in a horizontal plane and is then guided around gear 40 which stands in a vertical plane which, however, is diagonal to the plane of reversal gear 41. In this manner, after passing around gear 39, the chain again comes to lie on the right side as viewed in the direction of motion, with the result that the vertex of the cogs again face upwards. If the chain were simply returned, the chain would lie on the opposite side of the upper or the lower section, which, from the point of view of construction, would render difficult the installation of egg collection point 9.

The device according to the invention operates as follows: By activation of the collecting-transport device 7, the transport medium located in collecting-transport device 7 is propelled by a single-chain cog transporter in the model version developed according to the invention. This single-chain cog transporter 19 propels the chaff to egg collection point 9, and then runs upwards to the upper section where it serves as mechanism for feeding the chaff to the individual drop-tubes 11. The chaff flows downward in drop-tube 11 and in adjustable and measurable amounts passes through the several openings 23 into the individual egg conveyor mechanisms which encircle the front sides of the cages. Now, when the individual egg conveyor mechanisms are turned on, they transport the eggs which have been picked up to the area of each bottom opening 24 into which the eggs fall with a portion of the chaff, whereupon they flow downwards in the drop-tube. As long as the collecting-transport device 7 circulates, the chaff and eggs will be removed at the lower end as they emerge through bottom opening 24a, whence they will be carried to egg collection point 9 if egg conveyor mechanism 15 is circulating. Just as soon as the lower egg conveyor mechanism 15 is shut off, the flow stops in drop-tube 11. In this way it is possible to gather, for example, only from cage battery 1 or cage battery 2 without affecting the other cage battery.

In the illustrated model version only two cage batteries are shown and each cage battery has only 3 superincumbent levels. It is of course possible to provide several cage batteries and it is, of course, equally possible to stack several levels one on the other without changing the invention in the slightest.

What is claimed is:

1. In an egg gathering mechanism for multi-level block-nest plants with egg conveyor mechanisms allocated to each level, which mechanisms feed into one or more drop-tubes having devices therein for retarding free-fall of the eggs as well as an additional collecting-transport device for the eggs located at the lower end of each drop-tube, the improvement comprising the use of chaff in the drop-tubes to retard the free-fall of the eggs, and means provided above and below the drop-tubes for feeding chaff into the upper end of each drop-tube and removing it from the lower end thereof after its passage therethrough, said collecting-transport device being constructed as an endless circulating conveyor that picks up the eggs at the lower end of the drop-tubes and then returns to the area of the upper end of the drop-tubes and, in so doing, serves also as a mechanism for feeding the chaff into the drop-tubes.

2. An egg gathering mechanism according to claim 1 in which said collecting-transport device is a single-chain cog conveyor that rides in a trough having an upper section connected to the upper ends of the drop-tubes and a lower section adjacent the lower ends thereof.

3. An egg gathering mechanism according to claim 2 in which said single-chain cog conveyor has V-shaped cogs, the vertex of each of which faces upwards and the sides of which point downward and define an open interior space between them, and in which chain return means for said single-chain cog conveyor is provided, comprising four chain return gears mounted in said trough, of which three stand in a vertical plane and one in a horizontal plane and which work together in such a way that the chain is on opposite sides of said trough in said upper and lower sections while the cogs of the chain always point upwards at the vertex.

4. An egg gathering mechanism according to claim 3 in which a silo for the chaff is provided connecting said upper and the lower sections, the silo being located before said chain return in said upper section when viewed in the direction of motion of the conveyor mechanism.

5. An egg gathering mechanism for multi-level block-nest plants with egg conveyor mechanisms allocated to each level, said mechanisms feeding into one or more drop-tubes having devices therein for retarding free-fall of the eggs, and wherein chaff is used in the drop-tubes to further retard the free-fall of the eggs, comprising:
   a. an additional collecting-transport device for the eggs located at the lower end of each drop-tube, said collecting-transport device being constructed as an endless circulating conveyor that picks up the eggs at the lower end of the drop-tubes and then returns to the area of the upper end of the drop-tubes and, in so doing, serves also as a mechanism for feeding the chaff into the drop-tubes;
   b. the egg conveyor in the egg conveyor mechanism allocated to each level being an endless circulating single-chain cog conveyor; and
   c. said egg conveyor mechanism for each level passing through said drop-tube, and having a bottom opening in the area of the drop-tube for the passage of eggs into the drop-tube.

6. An egg gathering mechanism according to claim 5 in combination with a plant having several superincumbent cage levels and egg conveyor mechanisms wherein the drop-tube includes:
   a. a diagonal guide baffle above each egg conveyor mechanism, shielding the egg conveyor mechanism; and
   b. a diversion baffle deflecting the course of the chaff below each egg conveyor mechanism, such that the chaff follows an essentially serpentine course from top to bottom.

7. An egg gathering mechanism according to claim 6, in which a drop opening is provided in the diagonal guide baffle above the egg conveyor mechanism, which opening, when viewed in the direction of motion of the egg conveyor, is located behind the bottom opening of the egg conveyor mechanism.

8. An egg gathering mechanism according to claim 7 in which an adjustable pusher is installed behind the bottom opening of each egg conveyor mechanism, as viewed in the direction of motion of the egg conveyor, which pushers limit the depth of the chaff in a trough forming a part of the egg conveyor mechanism.

9. An egg gathering mechanism according to claim 8, in which the bottom of the lowest egg conveyor mechanism is closed in the area of the drop-tube through which it passes, but which has a bottom opening above the collecting-transport device which, when viewed in the direction of motion of the egg conveyor, lies behind the drop-tube.

10. An egg gathering mechanism according to claim 9, in which a feeder tube for chaff is provided, which guides chaff from the drop-tube to the lowest egg conveyor mechanism to a position behind the bottom opening provided in the latter, when viewed in the direction of motion of the egg conveyor.

* * * * *